United States Patent [19]

Iijima

[11] 4,292,718
[45] Oct. 6, 1981

[54] METHOD OF PRODUCING METAL BEARINGS

[75] Inventor: Yoshio Iijima, Nagoya, Japan

[73] Assignee: Daido Metal Company Ltd., Japan

[21] Appl. No.: 58,992

[22] Filed: Jul. 19, 1979

[30] Foreign Application Priority Data

Jul. 27, 1978 [JP] Japan ................................ 53-91712

[51] Int. Cl.³ ........................ B21D 7/04; B21D 53/10
[52] U.S. Cl. ....................... 29/149.5 DP; 29/149.5 S; 29/414; 72/331
[58] Field of Search ................. 29/149.5 S, 149.5 DP, 29/414; 72/331

[56] References Cited

U.S. PATENT DOCUMENTS 3,774,435 11/1973 Wales et al. ............... 29/149.5 DP

FOREIGN PATENT DOCUMENTS 2235933 2/1973 Fed. Rep. of Germany ..... 29/149.5 DP
1180742 2/1970 United Kingdom ........... 29/149.5 S Primary Examiner—Nicholas P. Godici
Assistant Examiner—V. K. Rising
Attorney, Agent, or Firm—Karl W. Flocks

[57] ABSTRACT

A method of producing metal bearings first by forming grooves substantially V-shaped in cross section on opposite surfaces of a composite plate in the form of a web comprising a bearing alloy layer and a backing metal layer and then by cutting the composite plate at the grooves to form severed portions of the composite plate into metal bearings, wherein cutting of the composite plate and forming of the severed portions thereof into metal bearings are carried out in one stroke so as to efficiently produce metal bearings. In forming the substantially V-shaped grooves, embossing or cutting may be used singly or they may be used in combination.

3 Claims, 6 Drawing Figures

METHOD OF PRODUCING METAL BEARINGS

BACKGROUND OF THE INVENTION

This invention relates to methods of producing metal bearings of semicircular shape or cylindrical shape (wrap-formed bush), and more particularly to a method for producing metal bearings wherein the number of process steps are reduced to produce metal bearings of high quality at high speed and with high efficiency and yet economically without damaging the metal bearings produced.

FIELD OF THE INVENTION

In the field of production of metal bearings, the following methods (1) and (2) are known in the prior art.

(1) In one method, a composite plate in the form of a web including a bearing alloy layer and a backing metal layer is formed by embossing on its opposite surfaces (bearing alloy layer and backing metal layer) with grooves substantially V-shaped in cross section, and cut it at the grooves to provide blanks. Then, each blank is formed into a desired shape, such as a semicircular shape or cylindrical shape.

(2) In another method, the composite plate is partly cut away at the grooves and subjected to partial bending. Then each partially bent portion is completely severed to provide a blank which is formed into a desired shape, such as a semicircular shape or cylindrical shape.

The methods described in (1) and (2) above include more than two process steps starting with cutting and ending with forming. Thus the methods of the prior art have had the disadvantages of not being suitable for mass production and being high in cost.

In the prior art, forming of the grooves on the bearing alloy layer has hitherto been carried out by embossing alone irrespective of the property of the material of the bearing alloy layer, particularly its extent of elongation. For example, when white metal or aluminum alloy of relatively high elongation is used as a material for forming the bearing alloy layer, production of metal bearings can be carried out by using embossing alone without trouble. However, when the bearing alloy layer is formed of copper, a lead alloy (kelmet), etc., of low elongation, the interior of the alloy is locally subjected to plastic deformation when embossing is effected. Thus the metal bearings produced have the defects such as changes occurring in alloy structure, reduced bonding strength between the alloy layer and the backing metal layer, chipping or exfoliation of the backing metal layer, and cracks being formed in the interior of the bearing alloy layer, etc.

SUMMARY OF THE INVENTION

This invention aims at obviating the aforesaid disadvantages of the prior art.

Accordingly, an object of the present invention is to provide a method for producing metal bearings wherein the number of process steps is reduced to produce metal bearings efficiently and economically without damaging the metal bearings produced.

Another object is to provide a method for producing metal bearings from a composite plate in the form of a web comprising a bearing alloy layer and a backing metal layer, wherein cutting of the composite plate to sever a portion thereof and forming of the severed portion into a metal bearing can be carried out simultaneously in one stroke in a single process step.

Still another object of the invention is to provide a method of producing metal bearings from a composite plate in the form of a web including a bearing alloy layer and a backing metal layer, wherein V-shaped grooves are formed on the backing metal layer by embossing and formed on the bearing alloy layer by cutting or a combination of embossing and cutting and the composite plate is cut at the grooves to provide severed portions which are formed into metal bearings.

DESCRIPTION OF THE PREFERRED EMBODIMENT

Figure 1:
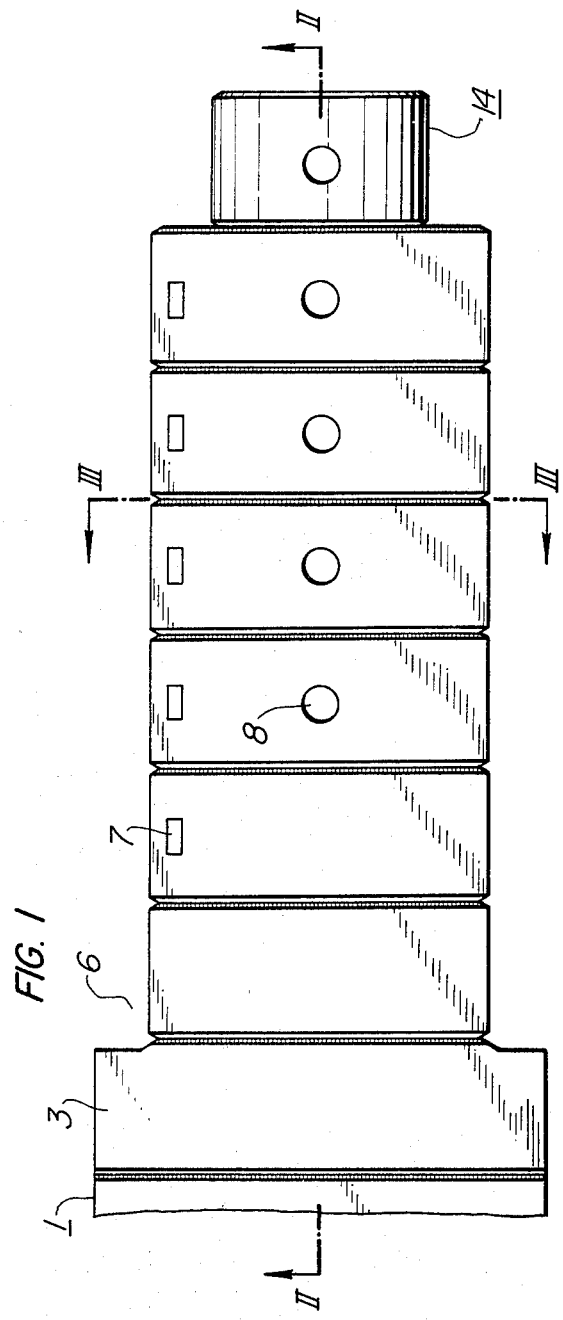
FIG. 1 is a plan view showing a composite plate in the form of a web moved forwardly through various process steps until forming of a metal bearing is finished.
Figure 2:
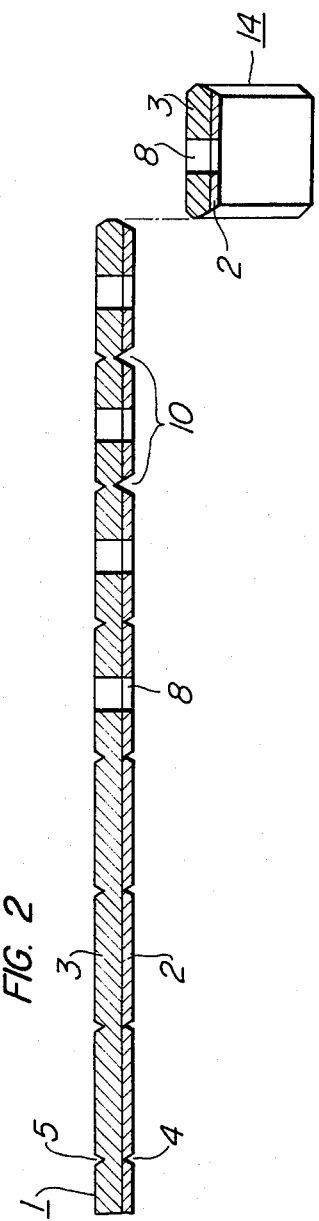
FIG. 2 is a sectional view taken along the line II—II in FIG. 1.

A preferred embodiment of the present invention will now be described by referring to the drawings. In FIGS. 1 and 2, a composite plate 1 in the form of a web is moved forwardly and successively at a predetermined interval from left to right by a moving means, not shown. The composite plate 1 itself is produced by a known method, and description of the composite plate and the method for producing same will be omitted.

The method according to the invention comprises the following process steps:

Step 1

Grooves 4 and 5 substantially V-shaped in cross section are formed by embossing on a bearing alloy layer 2 and a backing metal layer 3 of the composite plate 1, as shown in FIGS. 1 and 2. Preferably, the grooves 4 have a depth substantially similar to or smaller than the thickness of the bearing alloy layer 2.

The bearing alloy layer 2 is preferably formed of a material having relatively low elongation, such as copper, a lead alloy (kelmet), etc.

Step 2

Cutouts 6 are formed in the composite plate 1 as shown in FIG. 1.

Step 3

A trade mark, parts number and the like are marked at 7 on the surface of the backing metal layer 3.

Step 4

Oil holes 8 are formed by means of a press having a punch and a die.

Step 5

Figure 3:
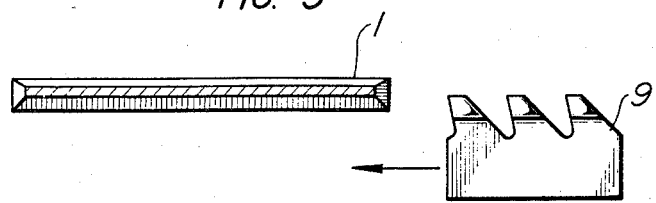
FIG. 3 is a sectional view taken along the line III—III in FIG. 1; showing the composite plate in a cutting step.

The grooves 4 formed, as shown in FIG. 2, on the bearing alloy layer 2 by embossing are further formed into grooves 10 by moving a cutting tool 9 on the grooves 4 in the direction of an arrow shown in FIG. 3. As clearly seen in FIG. 2, the grooves 10 have their bottoms at the backing metal layer 3 and are larger in size than the grooves 4.

Forming of grooves on the bearing alloy layer 2 may be effected by cutting alone. However, the use of embossing and cutting in combination is preferable in view of carrying out production on a mass production basis and by taking wear on the cutting tool into consideration.

In case the bearing alloy layer 2 is formed of a material having relatively high elongation, such as white metal, some aluminum alloys etc., step 5 may be eliminated so that groove forming will be carried out by embossing alone as is the common practice nowadays, without using cutting. The cutting step is intended to enable the method to handle various different types of bearing alloy.

Step 6

Figure 4:
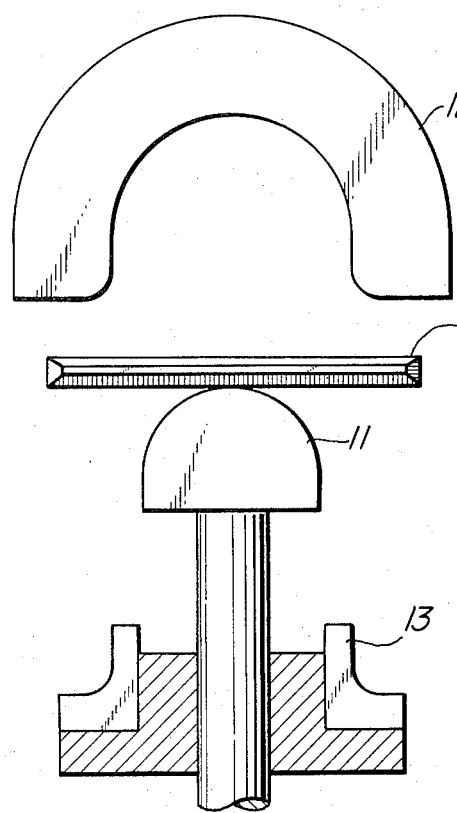
FIG. 4 is a front view of the composite plate fed to a press, showing the composite plate in a state before a portion thereof is severed and formed into a metal bearing.
Figure 5:
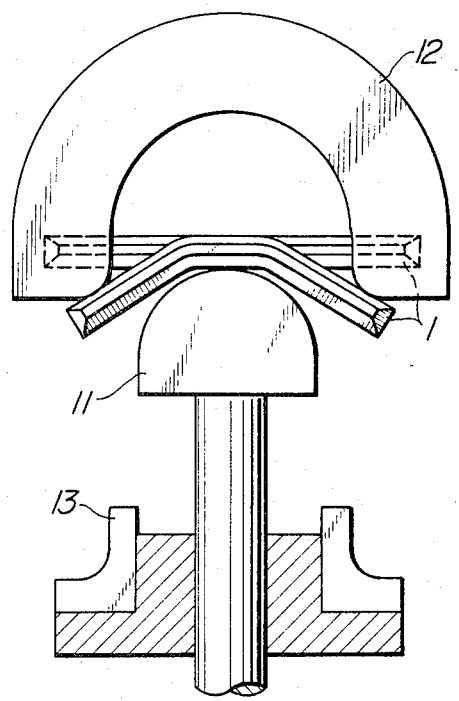
FIG. 5 is a front view of the composite plate wherein a portion thereof is in an intermediate stage of forming into a metal bearing, after having been severed from the composite plate.
Figure 6:
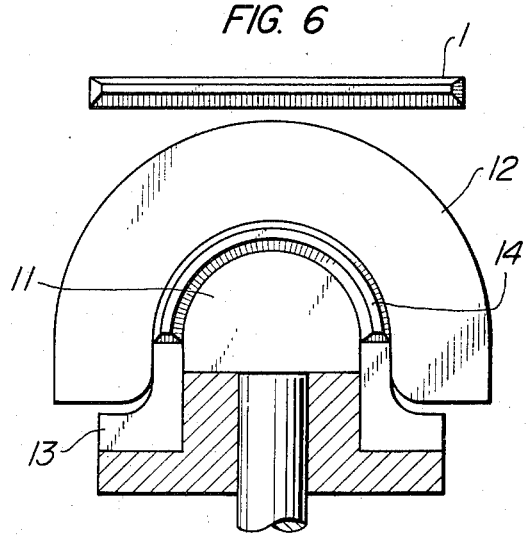
FIG. 6 is a front view of a semicircular metal bearing just produced from the composite plate.

FIG. 4 shows the composite plate 4 fed to the central portion of a punch 11 of a press. As shown in FIG. 5, a forward end portion of the composite plate 1, which is disposed on the punch 11, is bent and formed into a semicircular shape as a die 12 moves downwardly while the forward end portion is successively cut at the grooves 5 and 10 by the die 12 and punch 11, until the forward end portion is completely severed from the rest of the composite plate 1. The severed semicircular portion is given with a final shape by a block 13 as shown in FIG. 6, to thereby produce a metal bearing 14 of the semicircular shape.

FIGS. 1 to 6 show that cutting of the forward end portion of the composite plate 1 from the rest of the plate 1 at the V-shaped grooves 5 and 10 and forming of the severed forward end portion into the semicircular metal bearing 14 are carried out in one stroke (in one process step) and finished at the same time.

In the method described hereinabove, an additional process step may be provided if it is necessary to form oil grooves on the metal bearings depending on the use to which they are put. In the embodiment shown and described hereinabove, the step of forming oil grooves is eliminated. While the invention has been shown and described by referring to the example of forming metal bearings of the semicircular shape, it is to be understood that the present invention is not limited to this specific form of the metal bearings, and that metal bearings of the cylindrical shape or wrap-formed bushes may be produced by the method according to this invention by changing the shaping machine used. Also, in the press described as being used for producing metal bearings, the die 12 moved downwardly. However, the press may be constructed such that the punch 11 moves downwardly or the punch 11 and die 12 move toward each other.

From the foregoing description, it will be appreciated that the method for producing metal bearings according to the present invention comprises the step of embossing which is known and the additionally applied step of cutting depending on the type of material for forming the bearing alloy layer, and that the method is novel in that both the cutting of a portion of the composite plate and the forming of the severed portion of the composite plate into a metal bearing are carried out in one stroke (in one process step). Thus the object of producing metal bearings of high quality can be accomplished at high speed, with high efficiency by reducing the number of process steps without damaging the metal bearings produced.

While a preferred embodiment of the present invention has been shown and described hereinabove, it is to be understood that the invention is not limited to the specific steps of the method, and that many changes and modifications may be made therein without departing from the scope of the invention.

What is claimed is:

1. A method of making composite metal bearings of semicircular or cylindrical shape from a composite strip of bearing plate consisting of a bearing alloy layer and a backing metal layer, which comprises the steps of:
   (a) feeding a composite strip of bearing plate lengthwise, step by step, past a number of stations arranged to perform necessary operations;
   (b) embossing on opposite sides of the strip in one stroke a pair of transverse grooves substantially V-shaped in cross section in such a manner that the groove on the surface of the backing metal layer is embossed to a depth less than the thickness of the backing metal layer, the groove on the surface of the bearing alloy layer is embossed to a depth equal to or less than the thickness of the bearing alloy layer, and the pair of grooves are formed in generally parallel alignment with each other;
   (c) additionally subjecting the groove formed by embossing by the preceding step on the surface of the bearing alloy layer to a cutting step so as to enlarge the size of the groove in both its depth and width so that the groove extends beyond the interface between the bearing alloy layer and the backing metal layer and further into the backing metal layer; and
   (d) bending and forming, between a set of punch and dies, a blank of the composite bearing plate provided with said grooves of desired shape and size directly into a partly severed blank having final cross sectional configuration, and then completely severing said blank from the rest of the strip of said composite bearing plate in such a manner that said bending, forming and subsequent severing of said blank are performed by a one stroke operation.

2. A method of making composite metal bearings of semicircular or cylindrical shape from a composite strip of bearing plate consisting of a bearing alloy layer and a backing metal layer, which comprises the steps of:
   (a) feeding a composite strip of bearing plate lengthwise, step by step, past a number of stations arranged to perform necessary operations;
   (b) embossing a transverse groove substantially V-shaped in cross section on the surface of the backing metal layer to a depth less than the thickness of the backing metal layer;
   (c) cutting on the surface of the bearing alloy layer a transverse groove substantially V-shaped in cross section to a depth that the groove extends beyond the interface between the backing metal layer and the bearing alloy layer up to the interior of the backing metal layer and so that it is in generally parallel alignment with the V-shaped groove formed on the surface of the backing metal layer; and (d) bending and forming, between a set of punch and dies, a blank of the composite bearing plate provided with said grooves of desired shape and size directly into a partly severed blank having final cross sectional configuration and then completely severing said blank from the rest of the strip of said composite bearing plate in such a manner that said bending, forming and subsequent severing of said blank are performed by a one stroke operation.

3. A method of making composite metal bearing of semicircular or cylindrical shape as claimed in claim 1 or 2, wherein said cutting of a transverse groove in each of the step (c) is performed to have such a depth that the groove extends at most up to the interface between said bearing alloy layer and said backing metal layer.

* * * * *